J. S. FIELD,
Assignor to S. A. ILSLEY & Co.
Sheet-Metal Can.

No. 8,911.

Reissued Sept. 30, 1879.

Witnesses

Chas. H. Smith
Harold Serrell

Inventor.

Joseph S. Field.
per Lemuel W. Serrell
Atty.

N. PETERS, PHOTO-LITHOGRAPHER, WASHINGTON, D. C.

UNITED STATES PATENT OFFICE.

JOSEPH S. FIELD, OF BROOKLYN, NEW YORK, ASSIGNOR TO S. A ILSLEY & CO., OF NEW YORK CITY.

IMPROVEMENT IN SHEET-METAL CANS.

Specification forming part of Letters Patent No. 186,084, dated January 9, 1877; Reissue No. 8,911, dated September 30, 1879; application filed May 2, 1879.

*To all whom it may concern:*

Be it known that I, JOSEPH S. FIELD, of Brooklyn, in the county of Kings and State of New York, have invented an Improvement in Sheet-Metal Cans, of which the following is a specification.

Sheet-metal cans have been made with a space between the top of the can or vessel and the inner surface of the lid, and the edge of the rim has been soldered to the body of the can, and in some instances the edge of the cover has been bent up as a rim of semicircular shape sectionally, and the edge has been soldered to the side of the can near the upper edge, and percussion has been used for opening the can by striking upon the cover to break the solder.

When the rim of the cover is driven down to break the solder, its edge passes below the line of solder, and this solder, forming more or less of a ridge, renders it difficult to lift off the cover, even after the solder has been broken.

I employ in my can a device that I term a "separator." The same is combined with the can-body and its cover, and when pressure or percussion is applied to open the can this separator insures the rupture of the frangible soldered joint.

I also weaken the sheet metal by incisions that are closed by solder, so as to be tight, but when pressure or percussion is applied to the cover the solder breaks at the incisions and allows the parts to expand and the cover to be removed.

Figure 1:
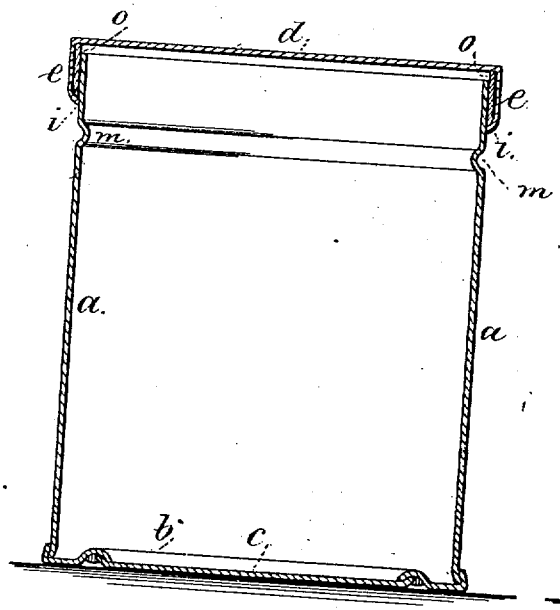
Figure 2:
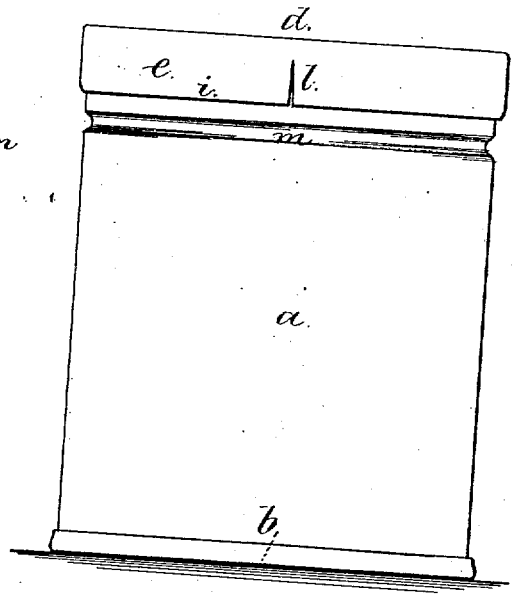
Figure 3:
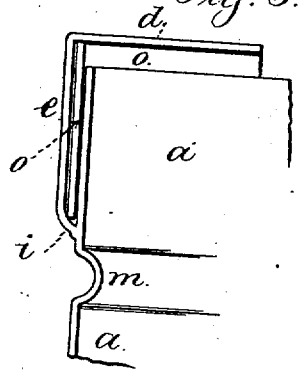

In the drawings, Figure 1 is a section of the can complete. Fig. 2 is an elevation of the same, showing the incision in the rim of the cover; and Fig. 3 is a section of a portion of the can and cover in larger size.

The can is made of the sides *a* and bottom *b*, firmly united together. It is usually preferable to solder the cover to the body of the can before the can is filled, and to provide an opening in the bottom or in the cover, and close the same by a disk, *c*, as heretofore usual.

Can-covers have been made out of one piece of sheet metal, struck up in a die, with a cylindrical rim, and also of a disk with a cylindrical and forming the rim. My cover *d* and rim *e* are made in either of these ways. The edge *i* of the cylindrical sheet-metal rim that is to be soldered is bent inwardly, so as to rest edgewise against the sides *a* of the can and receive the narrow and frangible line of solder that hermetically seals the can, and may be easily broken by the pressure upon the cover.

I have shown incisions at *l* in the rim of the cover. These incisions are closed by solder. When pressure or percussion is applied in opening the can, the solder is broken and the incisions allow the metal to spread in liberating the cover, so that the said cover can be removed with facility.

In cases where the sheet metal employed is sufficiently stiff to act in the rupturing of the frangible solder, the returned edge *i* of the cover and the incisions *l* are all that will be required in order to separate the cover by pressure or percussion and allow of its removal.

Sheet-metal cans are usually made of comparatively thin metal, and it is desirable to break the soldered joint without the risk of the metal bending under concussion and not breaking the solder. To effect this object I make use of a separator combined with the can body and cover, the duty of such separator being to aid in breaking the frangible solder, and thereby preserve the cover, so that it is adapted to subsequent use in covering the can. In the drawings, the separator *o* is represented between the cylindrical portion *e* of the cover and the body of the can, and the lower edge of this cylindrical portion of the cover is bent inwardly, as aforesaid, and soldered to the can. The lower edge of the separator is near to the solder, but is not united to the can by solder.

This separator is preferably of iron, so that the solder will not be likely to adhere thereto when the rim of the cover is soldered to the body of the can, as represented, and the separator in this case acts as a wedge or cutter to aid in breaking the solder when percussion or pressure is applied in opening the can.

The separator and cover are in their proper relative positions both before the cover is soldered to the can and after the solder is broken; hence there are two thicknesses at the rim of the cover.

The space that is represented between the top of the can and the under side of the cover allows the two cylindrical parts *o* and *e* to be driven down.

The groove at *m* may be used to indicate the position of the edge of the cover.

I am aware that bands have been soldered around the rim of the cover and to the body of the can, to make a tight joint, and that in this instance there was an unsoldered edge between the outer and inner thicknesses of the metal; but that unsoldered edge was at a distance from the line of solder, and hence the same could not act as a separator to break the line of solder.

I claim as my invention—

1. In a can adapted to be opened by pressure or percussion, the combination, with the can-body and the cover, of a separator, substantially as and for the purposes set forth.

2. The combination, with the can, of a cover having a rim with two thicknesses of sheet metal, the lower edge of the outer thickness being turned inwardly and soldered to the can, and the lower edge of the inner or intermediate thickness forming a separator for breaking the line of solder when percussion or pressure is applied to the cover, substantially as set forth.

3. The sheet-metal cover for a can made with a rim that is parallel, or nearly so, with the body of the can, and having one or more incisions in the rim, the incisions being closed and the edge of the rim soldered to the can, substantially as specified.

4. A sheet-metal can having a cover that is soldered at its edge, and in which the metal is weakened by one or more incisions that are soldered up, so that the solder will break at such incisions when pressure is applied to the cover and allow the parts to expand in removing the cover, substantially as set forth.

Signed by me this 30th day of April, 1879.

JOSEPH S. FIELD.

Witnesses:
GEO. T. PINCKNEY,
CHAS. H. SMITH.